United States Patent [19]

Miller

[11] 4,357,671

[45] Nov. 2, 1982

[54] DISPLAY GENERATION APPARATUS

[75] Inventor: Paul A. Miller, Scituate, Mass.

[73] Assignee: Sunrise Systems, Inc., North Scituate, Mass.

[21] Appl. No.: 160,157

[22] Filed: Jun. 17, 1980

[51] Int. Cl.³ ........................ G06F 15/20; G06F 3/147

[52] U.S. Cl. .................................... 364/518; 340/750; 340/752; 340/782; 340/792

[58] Field of Search ................ 364/515, 518; 340/750, 340/752, 782, 789, 791, 792, 793

[56] References Cited

U.S. PATENT DOCUMENTS

| | | | |
|---|---|---|---|
| 3,493,956 | 2/1970 | Andrews et al. | 340/792 X |
| 3,742,842 | 6/1973 | Albrecht et al. | 340/792 X |
| 3,742,843 | 6/1973 | Ogle | 340/777 |
| 4,024,531 | 5/1977 | Ashby | 340/792 X |
| 4,162,493 | 7/1979 | Ross et al. | 340/752 |
| 4,196,413 | 4/1980 | Sowa | 340/792 X |
| 4,197,590 | 4/1980 | Sukonick et al. | 340/792 X |
| 4,205,312 | 5/1980 | Nelson | 340/792 |

OTHER PUBLICATIONS

Interfacing μC displays: Tradeoffs and Techniques for Two Basic Strategies, Digital Design, Sep. 1976, vol. 6, No. 9, pp. 12, 14, 16.

*Primary Examiner*—Felix D. Gruber

*Attorney, Agent, or Firm*—Jerry Cohen

[57] ABSTRACT

Display generation apparatus utilizing a matrix of lamps with solid state switching elements, e.g., an active solid state device in series with an incandescent lamp or a light emitting diode (LED) with micro-computer control utilizing the matrix of solid state devices as a memory portion and providing image generation in a memory portion remote from the display matrix with shifting between such "memory" portions and control to effect column to column movement at high speed within the display and, further, effecting the transfer of image between memory portions under a normal/reverse/freeze control, the overall combination affording dynamic display effects difficult to achieve in software alone.

5 Claims, 4 Drawing Figures

DISPLAY GENERATION APPARATUS

BACKGROUND OF THE INVENTION

The present invention relates to display panels with rapidly moving and changing alphanumeric and other images, selectable in a wide variety. The invention has applicability in various sizes from very small (e.g., salesman's suitcase display or stock sale ticker) to roadside billboard type, or larger, sizes.

The objects of the invention are to provide display generation apparatus affording the foregoing features economically and reliably and, consistent therewith, further affording programmability, user design options, the ability to make a library of display images and controlled rapid access thereto.

SUMMARY OF THE INVENTION

Display generation apparatus is provided in accordance with the invention with the following salient structural and operational features:

1. Structural (a) A modularly assemblable display panel of a matrix of solid state lamps (LED's) and current limiting resistors (incandescent lamps can also be used). Said matrix is typically elongated horizontally with approximately one hundred vertical columns of seven lamps each for the purpose of displaying a horizontal line of characters. There may be fewer or more columns or fewer or more lamps in a column. The whole array may be reoriented 90° for vertical elongation to display a vertical string of characters. In more elaborate variants of the invention the columns can be stacked end to end for multiple line displays or arranged in geometric patterns, e.g., stellate. Preferably groups of five columns of seven lamps each represent a single alphanumeric character or graphic element (and usually, one column is used to separate five column character groups, but the separation column can be directed by a user to bridge adjacent characters in the present invention). Larger character matrices are also possible in applications which would benefit from the higher resolution. In addition, non-alphanumeric images can be displayed to move across the display wholly or in part or to appear and dissolve.

(b) A micro-computer system is provided with central processing unit, system-operation-instructions in a read only memory, data and auxiliary program stores and sources matched to the processor and memory via standard input and output ports;

(c) A random access memory of the computer with the said display mapped onto a portion of the address space thereof by static or dynamically refreshed means, and with another but not necessarily distinct portion thereof comprising a site for image arrangement, the image being transferrable to the display by CPU memory to memory move sequences or direct memory access techniques. This image arrangement ("mental image defining") memory site is segregated, controlled and addressed in accordance with the present invention by special means defined below that accelerate the process of shifting the image left or right within the display.

(d) Auxiliary and over-ride components of the display generation apparatus for transferring image data between control-internal and display portions of the random access memory including (i) data latch means on a column by column basis;

(ii) column address decoding means;

(iii) column status controls, (A) allowing normal image data transfer, (B) refusing normal imge data transfer (i.e., freezing the prior data), (C) inverting ("reversing") image data transfer; including means for memorizing column status and selectively modifying the same;

(iv) external device synchronization for accompanying or related music, slides, machine operation, etc., and data receipt or transmission, time signal data injection (or coordination therewith);

(v) keyboard or like user control means for modifying image data and/or its transmission sequence

2. Operational (a) Memory mapping: The lamp matrix latches or, in the case of mutiplexed refreshed lamp driving means, the lamp refresh buffer is treated as normal memory by the central processing unit. For a left to right (as viewed) progression on the display all columns left to right respond to successive memory locations of the block of memory allocated to the display. Data written to these locations typically comes from remote (control-internal) memory portion where image data is initially stored as a mental image before transfer to display. The CPU can very quickly shift the data in the mental image block left or right an arbitrary number of columns by simply writing a displacement value to an output port which controls the physical addressing of that memory segment.

(b) Column status control: When the central processing unit moves a column of data to the display memory portion, two corresponding column control signals are generated. One of these signals can prohibit data from being written into the destination column. This is called herein "freezing" a column. The freezing technique permits a pseudo foreground-background effect to be generated, among other benefits thereof. Provided that a column is not frozen, the other column status control signal can cause that column to be written with inverted (or reversed) data. The reversal operation permits a variety of novel visual effects.

(c) General operation: The system allows a very wide variety of graphical operations to be performed. High level user language instructions cause user text or time or temperature to be decoded into dot matrix patterns in the mental image block. The CPU controls the way the mental image is transferred to the display. It can move continuously at different speeds and under different fonts, which are balances between character and background intensity. The same patterns, if limited to the length of the display, can be brought onto the screen by various dynamic techniques, moved around within the mental image by being shifted up, down, left or right or by having selected portions turned upside down or backwards, modulated in place on the display by being transferred from the mental image to the display using varying sequences of four different rules of transfer or display states (characters lit against dark background, dark against lit, fully lit, fully dark) using another group of visual dynamic sequence techniques, and removed from the screen via another set of dynamic techniques. The mental image address manipulation hardware assists the CPU in doing these things quickly and with a minimum of software. The column status controls functions simultaneously, in a way that is transparent to the CPU operations, providing yet another layer of control flexibility over the data moving to the display.

These and other objects, features and advantages of the invention will be apparent from the following detailed description with refererence therein to the accompanying drawing in which:

DETAILED DESCRIPTION OF PREFERRED EMBODIMENTS

Figure 1:
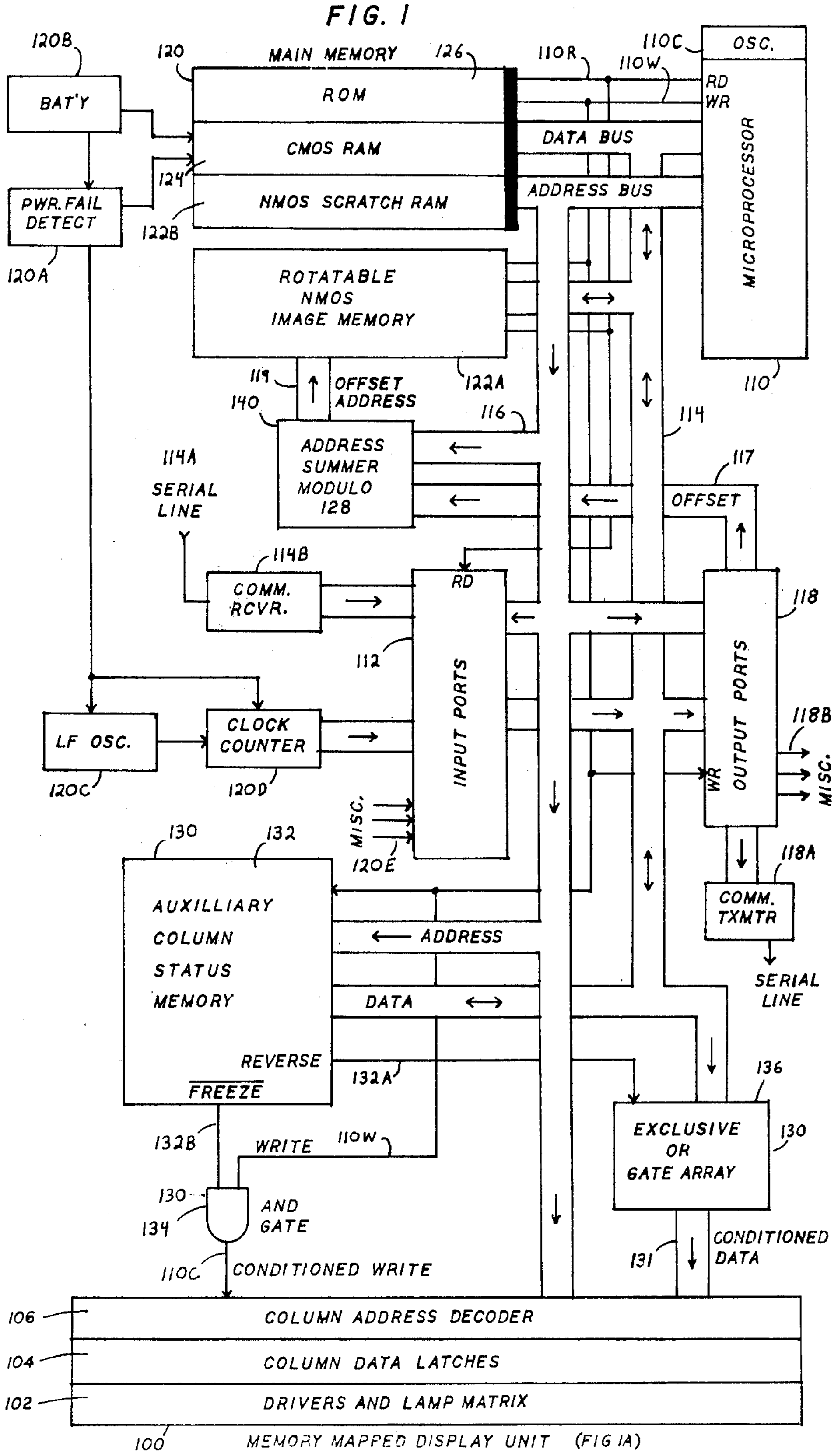
FIG. 1 is a schematic diagram of the electrical hardware arrangement of the apparatus of the invention according to a preferred embodiment thereof.

Referring now to FIG. 1, there is shown a memory mapped display unit 100 comprising a panel matrix 102 of light emitting matrix diodes 102 D (shown schematically in FIG. 1A) arranged in 96 columns of seven lamps with corresponding drivers (voltage source(s) 102 V and corresponding dropping resistors 102 R) with latching means 104 and column address decoding means 106.

Figure 1A:
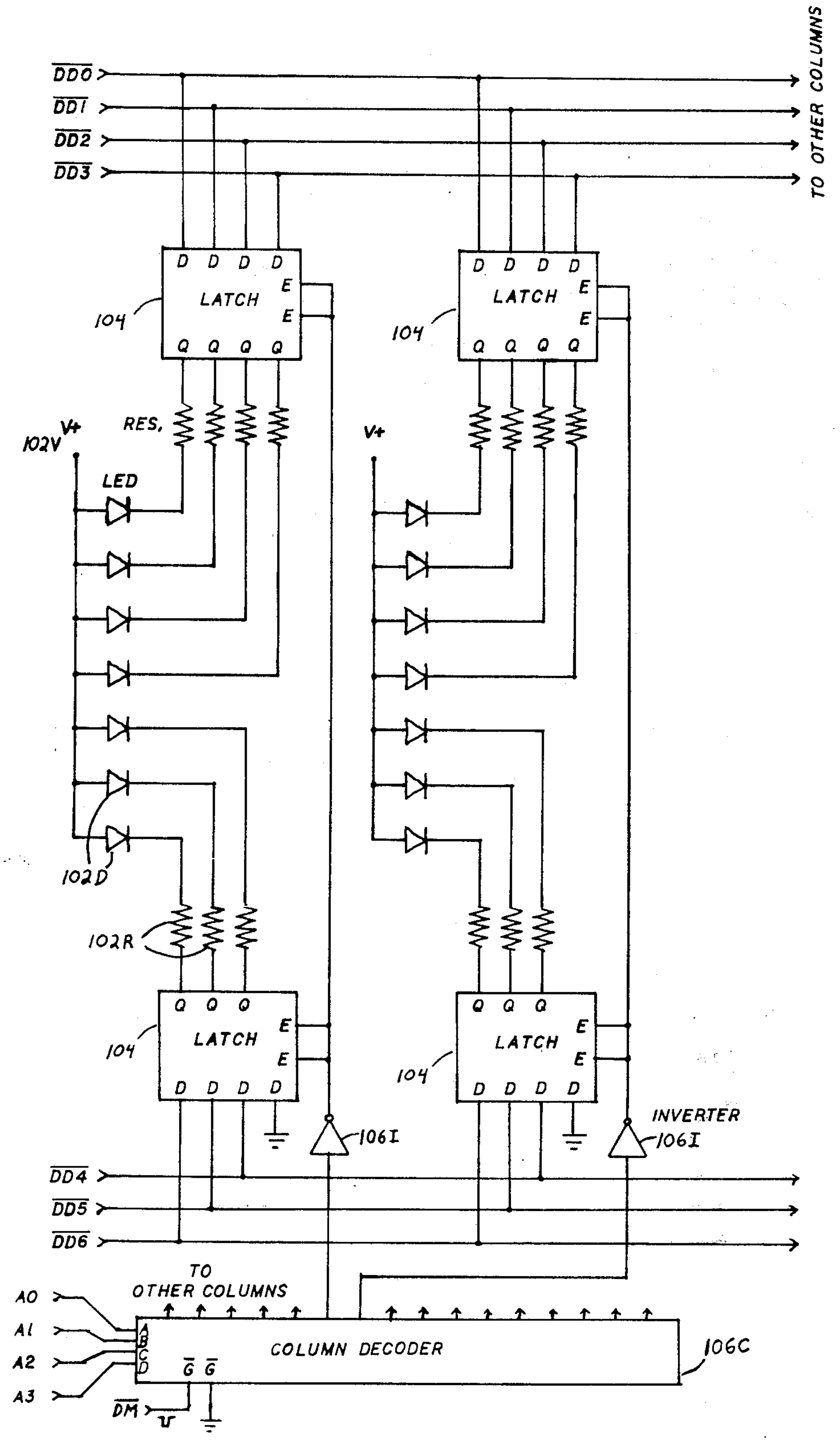
FIG. 1A is a schematic partial view of a display portion thereof.

In FIG. 1A, there is depicted two columns of lamp matrix circuitry which is contained on a printed circuit board module encompassing 16 such columns. Six such PC boards comprise the 96 column array described in this implementation. In this embodiment, which uses two integrated circuit packages for each column of display, every lamp is physically connected by a separate wire and dropping resistor to an output pin associated with a corresponding bit in the display latch memory. The latches 104 are 7475s. Since the output drive capability of the 7475s is adequate to drive the LED lamps directly, there is no need in this embodiment for additional driver circuits between the latches and LED lamps. Each 7475 stores four bits of data provided on the data input pins when the enable input is pulsed high, indicating that the address bus specifies that data is to be written to the particular column containing the 7475s under discussion. The Q output pins of the 7475s are connected via the optional dropping resistor 102R to the lamps 102D, which return to a voltage source. The data input lines $\overline{\text{DD}\phi}$ and $\overline{\text{DD7}}$ extend across the entire length of the display, with the latch, lamp, resistor structure repeated at every column position. The column decoder chip 106C is a 74154 and serves 16 adjacent columns. The active low strobes produced by it are inverted by 7404 inverter sections 106I to produce active high strobes suitable for driving the enable inputs of the latches 104. The decoder chip is repeated every 16 columns. For a 96 column display, there would be six column address decoders. These are selected for activation on a mutually exclusive basis by the decoding of address bits A4, A5, A6 and conditioned Write pulse into separate strobes DMO to DME by 151 (a 7442) on FIG. 3.

Thus the pattern seen in the lamps is stored in flip-flop cells in the 7475s. The array of 7475s responds to a block of address space of the microprocessor 110, and behaves as memory when the CPV writes it. The fact that this memory is not readable by the microprocessor in this embodiment is not to indicate that it could not be made so by additional bussing. Other embodiments could use storage cells other than 7475s to store the final bit pattern data for the lamps, and means other than direct fully parallel connection to cause the state of the storage latch cells to effect lamp energization. Specifically, in accordance with well known expedients of the prior art, the latch function could reside in any read-write memory chip, and a programmed processor interrupt and/or direct memory access technique could be used to dynamically refresh the lamp matrix from the bit storage site possibly via a sequential row drive multiplex method in which all the anodes (or cathodes) of the lamps in any one row are common, and all the cathodes (or anodes) of the lamps in any column are common. Both methods of effecting lamp energization on the basis of bit storage site content are in widespread use as standard techniques, and neither is central to this invention, which concerns itself with the manipulation of the bit patterns before and during the operation of storing them in the final semiconductor latch sites which then subsequently, by the means shown, or any other means, cause the lamps to be turned on or off in the bitwise correspondence to the dot patterns represented by the data stored in the latch sites. The technique used to energize the lamps affects the internal structure of the memory mapped display unit 100, but the conceptual view of the latches 104 as a memory constituting a physical storage site for data bits intended to control the lamps on a lamp for bit basis is unaffected.

Returning now to FIG. 1, general microcomputer components comprise comprise an 8-bit microprocessor 110 (although 4/16/32 bit processors may also be utilized with straight-forward adaptations), a main memory 120, portions of which comprise the lamp matrix 102, an N-MOS random access memory 122B for handling operating system variables, a user program memory section 124 implemented in (low power requirement) C-MOS (to allow effective use of battery 120B with a power failure detector 120A to avoid loss of user program in case of power line failure), and a read only memory 126 with operating system instructions and interpreter code therefor, for display generation and other operating functions.

Additional general microcomputer components include input ports 112 and output ports 118. A low frequency crystal oscillator 120C and time of day counter 120D (divide circuit) are provided.

A crystal oscillator 110C is provided for the central processing unit. A terminal keyboard unit not shown provides (preferably serial transfers; but parallel may be accommodated per se or with parallel/serial conversion) user data via a serial line receiver 114B. Time of day and other miscellaneous inputs (e.g., from temperature and other transducers—such as a starting footpedal or electric eye detector—or synchronizing pulses) can also be provided via the input ports.

An eight bit data bus 114 an address bus 116 and control lines 'READ' 110R and 'WRITE' 110W interconnect the CPU 110, main memory 120, display 100, input prots 112 and output ports 118.

The output ports may transmit data out (e.g., to tape or disc storage, to a communication modem, as synchronizing and data pulses to a projector or audio device or machine) via output lines indicated at 118B and/or a serial line transmitter 118A.

This completes the discussion of general microcomputer components. Further discussions will relate to two distinguishing characteristics of the architecture which are new.

The first involves a segregated portion of system memory 122A used to assist in rapidly moving image pattern data in address space. Addressing of 122A proceeds via a summer 140 which combines the normal address bus 116 with an offset rotation bus 117 derived from one of the output ports 118 to provide an offset address 119. This mechanism is elaborated in FIG. 2 and accompanying text.

The second new feature is that the data bus and WRITE signal interconnections between 110/120 and display data latches 104 are conditioned via display column controls 130 comprising a memory element 132, an AND gate element at 134 and an exclusive-OR gate array indicated at 136. The memory 132 is constructed to define each display column as one of N normal; R reversed, F frozen. R/N processing proceeds via a line 132A to EXCLUSIVE-OR gates 136 (one for each data line or row), which derive conditioned data 131. Freeze processing proceeds via line 132B which selectively enables the WRITE signal 110W as it passes through the gate 134 to produce a conditioned WRITE signal 110C. More detail about this mechanism is provided in FIG. 3 and accompanying text.

The elements of display column controls 130 as depicted in the preferred embodiment shown comprise a specific example of a general architectural principle. The implementation of the auxillary control circuitry at 132 as a pure memory is not intended to indicate that the architectural function of generating the control signals 132A and 132B needed to direct the WRITE pulse conditioning element at 134 and data conditioning element 136 need necessarily be implemented as such. Pure combinational logic operative upon the address and data busses or a combination of memory and logic could also be used. Similarly, the logic function exclusive-or chosen as the content of data conditioning element 135 in this implementation, is not intended to restrict the logic function to exclusive-or. Any logic function, implemented as gates, memory, or both, could serve as well, depending on the specific implementation goals. In conjunction with this statement of generality as to the specific content of 132 and 136, it must be said that the control outputs 132A and 132B generated by 132 need not be restricted to single signals as in this embodiment, but either or both might be implemented as multiple line busses.

Figure 2:
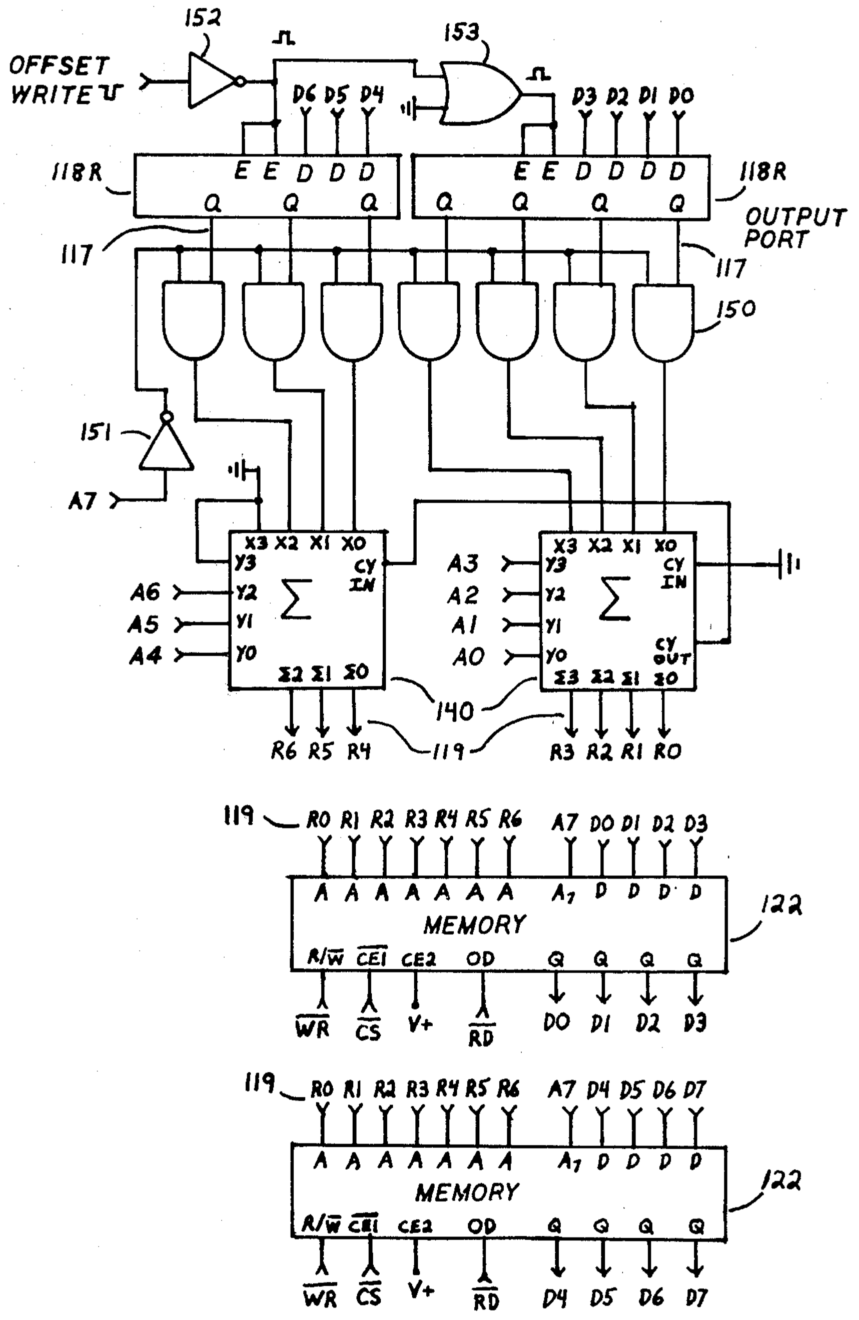
FIGS. 2 and 3 are similar diagrams of portions of the FIG. 1 apparatus.

In FIG. 2, the memory chips 122 comprise #2101 I.C.'s, the binary adders 140 comprise #7483 I.C.'s. The AND gates 150 are #7408's and the offset latch elements are #7475's. Address buss connections are indicated as A0, A1, et seq., and data buss connections are indicated as D0, D1, et seq. Inverter 152 is a 7404 providing an inversion of an offset write signal from the CPU to a positive pulse. Buffer gate 153 (#7432IC) simply provides increased load driving capability for this positive pulse.

The 2101's are 256×4 memory arrays gauged as wired herein to form a 256×8 memory array in which the lower order half (i.e., 128×8) is used as mental image block 122A (the balance 122B for memorizing CPU control and other functions as shown in FIG. 1).

Frequently the operating system is called upon to perform a sequence of operations in which a dot matrix pattern moves across the display. This operation is performed by executing a high speed loop which transfers the entire mental image block out to the display memory block and then moves the data in the mental image block up or down one location in memory before repeating the loop. The loop repeats as many times as there are columns to be traversed. It can be seen that the operation of moving the mental image block to the display block involves moving each column of data individually. The time required is significant since hundreds of transfer instructions may be executed in the performance of this function, which is unavoidable. The operation of moving the data in the mental image up or down by one (or more locations in address space (equivalent to a left of right shift after transfer to the display) is equally costly since it involves moving the same number of memory words to another position. This causes the software overhead to be twice as high as if the computer only had to move the data from the mental image to the display on each cycle of the loop. This invention avoids such a penalty by segregating the addressing of that segment of memory which is used for the mental image. The particular segment of physical memory so modified to contain the mental image depends on the number of low order address lines dedicated to it. In the preferred implementation described herein, seven address lines $A_6$—$A_0$ are used to cause a 128 byte block of memory to participatein this transformation. The particular block chosen happens to extend in the example below from locations (hexadecimal) 4400–447F of RAM portion 122A. When the CPU ddresses 4400 it considers this the leftmost column. In the 96 column implementation location 445F is the rightmost column. The process for writing the mental image block out on the display simply involves moving block 4400–445F to the memory space of the display.

Because only the lower order address bits are modified by the addition of an equal number of bits defined as a constant by an output port discarding any carry out of the addition, the resulting physical address space becomes circular.

For example, if the CPU writes sequential digits 0–127 into memory locations 4400–447F after having initialized the output port constant to zero, physical location 445F will contain 95 because CPU or logical locations are being mapped into physical chip locations directly. If the CPU now changes the constant in the output port to 1, then logical address 4400 will be translated into 4401, logical 445F will be translated into 4460, and logical 447F will be translated into 4400 because the carry out of 7F+1=80 is discarded leaving 00. The CPU wil now read 1 instead of 0 at 4400 and 96 instead of 95 at 445F. This is exactly what would happen if it had laboriously gone through all 128 locations and moved each byte down one address, excepting that 4400 would be moved to 447F. The transformation has been accomplished in a few machine instructions instead of hundreds. The surplus address space from 4460–447F which does not map out to any display columns is used as a buffer zone where the CPU can unpack the dot matrix data of characters about to come on-screen. The array of AND gates 150 (#7408 I.C.'s Z48 and Z49) are not fundamental to the operation of the address translator. They are present in this implementation simply to allow Address bit 7 via 7404 inverter 151 which designates the upper half of the 256×8 memory in Z19 and Z20 to disable the address offset 117 coming from the 7475 output port latches and force it to zero so that the operating system variables stored in the upper half of these two memory chips will remain fixed in address space. These gates would be unnecessary if it were decided to use 8 address bits in the segregated mental image block providing 256 columns of rotated address space, with the operating system using other chips for its variables.

Figure 3:
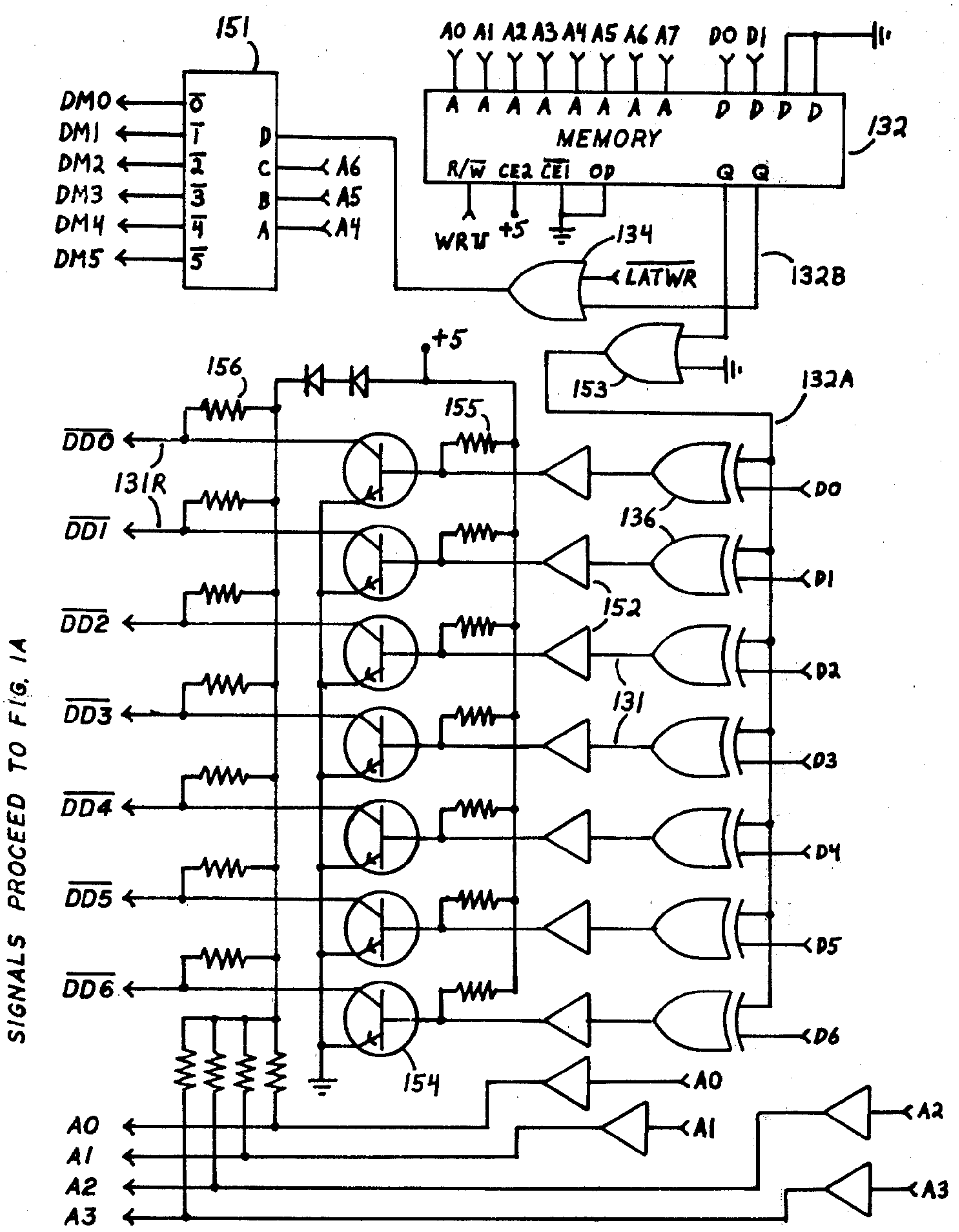

FIG. 3 shows in more detail the arrangement of display column controls generally described in FIGS. 1 and 1A and accompanying text. The column status memory 132 implemented as #2101 I.C. provides the two column status control signals (132A for controlling reversal which is current buffered by 153 a section of a 7432, and 132B for controlling freezing).

Reversal line 132A serves to drive the exclusive-OR gates 136 present in each bit of the data buss path to the display rows; these gates are implemented with #7486 I.C.'s. These gates have their output current capability increased by 7407 I.C. sections 152 in series with discrete (2N2222) transistor stages 154, 155, 156. The final row drive outputs appear as high current data drive signals which are connected to the inputs of every 7475 column data latch on the display module panel, on FIG. 1A.

Display data is therefore available at the inputs of each column data latch when the CPU writes a memory location belonging to the display block. Decoding of which column is to accept the data is performed in three stages. The total address space allocated to the display is decoded by dedicated gates in the CPU's address decode section (not shown). These gates also admit the CPU's WRITE line deriving the latch write signal LATWR which is pulsed once any time the CPU has set up the data buss with valid data it intends to load into any column of the display. This signal LATWR is shown in FIG. 3 as being conditioned by a #74312 I.C. OR gate 134 which is also driven by the freeze line 132B from the column status memory. This OR gate actually corresponds to AND gate 134 in FIG. 1. It is implemented here as a physical OR gate simply because the signals are being represented by negative true voltage levels.

The output of AND (OR) gate 134, is therefore pulsed once each time the CPU wants to write data to any column that is not frozen. This signal then enters a #7442 I.C. decoder 151 which performs the second level of column address decoding. In this implementation the 96 column display is broken down into six modules of 16 columns each. 151 decodes address lines 6, 5, 4 to deliver a write pulse to one of the six modules, provided that the target column therein is not frozen. The four low order address lines A3–A0 are buffered by current booster I.C. sections 152 which are implemented on the controller card as a #7407 I.C. These four address lines are then made available to column address decoder I.C.'s 106C (#74154) on each display card module which perform the final decoding into one of sixteen columns on each module.

The state of the art and hardware/software information sources useful in implementing the above described invention and its place in the art and incorporated herein by reference as though set out at length herein are:

1. U.S. Pat. No. 4,205,312, granted May 27, 1980, to Nelson and references cited therein.

EXAMPLE

The utilization of the above described apparatus and its range of capabilities are illustrated by the following software program and its analysis.

This program was written for use with apparatus as described in FIGS. 1–3 and the foregoing specification a Z—80 microprocessor C.P.U. was used as item 110.

```
   "        <        >        @        [        \        ]

000000   0000*0   000000   000000   0000*0   000000   000000
000000   000*00   000000   00***0   000**0   *00000   *00000
****00   00*000   000000   0*000*   00***0   0*0000   **0000
*00000   0*0000   ******   *00000   0****0   00*000   ***000
****00   00*000   000000   0*000*   0000*0   000*00   000000
000*00   000*00   000000   00***0   ******   0000*0   ****00
****00   0000*0   000000   000000   0*****   000000   ***000
```

(go down first column)

```
|^|F|Ø|^|Z|F|^|T|Ø|Ø|S|U|N|R|I|S|
|E|^|Z|^|Z|R|5|3|4|4|^|P|1|^|M|D|
|C|^|Z|F|Ø|1|5|2|^|P|8|^|V|Ø|^|I|
|O| |S|U|N|R|I|S|E| | | | | | | |
| |^|L|2|^|K|D|4|8|^|M|L|I|^|O|K|
|^|K|L|4|8|^|K|D|4|8|^|M|L|I|^|O|
|L|^|K|L|4|8|^|E|^|K|D|4|8|^|Z|^|
|M|B|C|^|K|S|5|4|^|Z|F|Ø|1|4|2|^|
|P|9|^|L|4|^|I|B|S|Y|S|T|E|M|S|^|
|O|B|^|E|^|P|3|^|Z|^|M|J|D|^|P|8|
|^|F|9|^|S|P|R|E|S|E|N|T|S| |A|N|
| |E|L|E|C|T|R|O|N|I|C| |P|R|O|G|
|R|A|M|M|A|B|L|E| |B|I|L|L|B|O|A|
|R|D|^|C|^|I|B|O| |R| |A| |C| |L|
| |E|^|M|B|C|^|Z|F|1|6|Ø|5|Ø|7|6|
|^|F|7|^|S|O|R|A|C|L|E| |O|R|A|C|
|L|E| |O|R|A|C|L|E| |O|R|A|C|L|E|
| |O|R|A|C|L|E|^|Z|^|P|9|^|I|B| |
| | | | |T|H|E| |D|I|S|P|L|A|Y|^|
|O|A|^|I|G|O|F| |T|H|E| |F|U|T|U|
|R|E|^|Z|F|8|8|5|9|^|L|2|Ø|^|M|X|
|R|C|I|^|E|^|Z|^|K|D|3|^|Z|F|5|5|
|4|2|^|O|K|^|P|5|^|I|B|>|>|>|>|>|
|>|>|>|<| | | | | | | |^|W|1|Ø|^|
|I|M|>|>|>|>|>|>|>|>|@|F|U|T|U|R|
|E| |^|Z|^|P|9|^|O|A|^|V|^|Z|R|7|
|3|4|8|^|M|D|D|^|F|Ø|^|S|[|]| | |
|[|]| | |[|]| | | | | |[|]| | | |
|[|]| |[|]| | | |[|]| | | |[|]| |
|[|]| | | | | | |[|]| | |[|]| | |
| | | | |[|]|^|V|Ø|^|P|3|^|I|B| |
| | | | | | | | | |[|]| | | | |^|
|K|D|2|^|B|6|3|1|Ø|^|Z|R|^|Z|N|7|
|3|4|8|^|K|S|3|8|^|B|2|5|1|Ø|^|Z|
|^|Z|R|7|3|4|8|^|K|D|5|6|^|L|5|^|
|K|S|6|^|K|D|6|^|E|^|O|L|^|Z|^|M|
|C|L|^|F|1|^|P|7|^|I|N|P|U|T| |T|
|H|E| |M|O|T|I|O|N|^|M|E|C|^|F|Ø|
|^|P|5|^|L|5|^|K|S|6|^|K|D|6|^|F|
|1|^|K|D|6|^|K|S|6|^|F|Ø|^|E|^|O|
|E|^|V|^|I|I|I|N| |P|R|O|M|O|T|I|
```

(jump to top of second column)

```
|O|N|^|M|C|I|^|P|9|^|L|1|Ø|^|M|D|
|R|C|I|^|E|^|L|1|Ø|^|M|C|R|C|I|^|
|E|^|P|8|^|L|2|^|M|L|D|^|M|L|I|^|
|M|L|L|^|M|L|C|^|P|Ø|^|E|^|O|O|^|
|O|N|^|O|J|^|V|^|P|8|^|S|T|H|I|S|
| |D|Y|N|A|M|I|C| |D|I|S|P|L|A|Y|
| |I|S| |A| |P|O|W|E|R|F|U|L| |A|
|T|T|E|N|T|I|O|N| |G|E|T|T|E|R| |
|T|H|A|T| |S|H|I|N|E|S| |I|N| |S|
|H|O|W|S|,| |S|T|O|R|E|S|,| |A|N|
|D| |M|E|E|T|I|N|G|S|^|F|2|^|P|5|
|^|S|O|R|A|C|L|E| |C|A|N| |E|V|E|
|N| |O|P|E|R|A|T|E| |I|N| |S|Y|N|
|C| |W|I|T|H| |M|U|S|I|C|^|F|Ø|^|
|V|Ø|^|I|A|O|R|A|C|L|E|^|P|9|^|L|
|3|^|M|G|L|^|M|G|I|^|M|G|D|^|M|G|
|C|^|E|^|O|A|^|S|C|A|N| |P|U|T| |
|Y|O|U|R| |P|R|O|M|O|T|I|O|N|^|P|
|7|^|I|B|L|I|G|H|T| | |Y|E|A|R|S|
|^|P|9|^|L|1|Ø|^|Z|^|Z|F|Ø|1|4|8|
|^|K|D|6|^|K|S|6|^|Z|F|^|Z|N|Ø|1|
|4|8|^|K|S|6|^|K|D|6|^|E|^|O|K|^|
|Z|^|Z|F|Ø|1|4|8|^|O|L|^|Z|^|P|6|
|^|I|E|A|H|E|A|D| |O|F|^|Z|F|6|1|
|5|^|O|K|^|I|K|T|O|M|O|R|R|O|W|^|
|P|9|^|L|1|Ø|^|M|X|R|C|I|^|E|^|O|
|H|^|I|O| | | | | | |O| |^|Z|^|P|
|8|^|M|I|D|^|M|L|C|^|K|S|2|9|^|M|
|I|D|^|M|L|C|^|Z|F|3|2|5|^|K|D|2|
|9|^|M|I|D|^|M|L|C|^|Z|^|L|6|7|^|
|M|I|C|^|B|^|M|I|C|^|B|^|K|L|1|^|
|E|^|V|^|P|5|^|F|Ø|^|Z|R|Ø|1|Ø|1|
|Ø|1|3|^|Z|R|Ø|7|Ø|2|Ø|2|3|^|Z|R|
|1|9|Ø|3|Ø|3|2|^|Z|R|3|1|Ø|4|Ø|4|
|2|^|Z|R|4|9|6|^|Z|R|6|1|9|^|Z|R|
|7|9|1|2|^|S|O|R|A|C|L|E| |I|S| |
|T|H|E| |M|E|D|I|U|M| |T|H|A|T| |
|K|E|E|P|S| |P|A|C|E| |W|I|T|H| |
|T|H|E| |8|Ø|'|"|^|M|A|L|^|M|E|D|
|^|P|8|^|M|L|L|^|Z|^|M|B|D|^|S|*|
|>|>|<|<|
```

The cycle time for a full program is typically about 4–5 minutes but highly graphical programs show a lot of variability in this regard. The length and repeat count of the loop structures is largely responsible for this. This program, since it keeps up a quick pace without lengthy repetitions, cycles in about three minutes and thirty seconds. The following is a breakdown of the program's operation on an instruction by instruction basis:

ˆF0

Font O is selected because it is the best Clear font to use with a mix of Normal and Reversed zones. (Font 1 is the best Inverted font when reversed zones are used.)

ˆZF ˆT00SUNRISE

Loads the Mental Image with the local time followed by the word SUNRISE. The ˆZF prevents the display from being affected yet. Waits one second automatically. This only serves to provide a one second break when the program cycles around again to the beginning.

ˆZ ˆZR5344

Unfreezes the display and defines area right of column 53 as Reversed. Display pattern still unaffected though. Zone instructions just setup areas on the screen to react to subsequent active instructions in different ways. They do not drive the lamps themselves.

ˆP1 ˆMDC

We slow down to Pace 1 for this Modulate operation which reveals the Mental Image in the Clear state by opening the curtains. The SUNRISE part though looks Inverted because of the previous ˆZR5344.

ˆZFϕ152

Freezes the left part of the display, where the time is, throughout the upcoming loop.

ˆP8 ˆVϕ

Much faster from now on at pace 8. ˆVϕ sets the Automatic Wait Duration (AWD) to ϕ so that there will be no waits after any ˆI instructions. This won't actually do anything until quite a bit later at the ˆIBSYSTEMS since the ˆIO which follows the ˆVϕ is a special variant of ˆI which never waits. The ˆVϕ just as well have been put anywhere else preceding the ˆIBSYSTEMS.

ˆIO$SUNRISE$$$$$$$$

Loads SUNRISE into Mental Imagae. Spaces bracketing word force loading at left end with one leading space. Deletion of first and last space would function identically and save two locations of memory.

ˆL2

Loop twice through everything up to the next ˆE that follows 37 characters later.

ˆKD48 ˆMLI ˆOK

SUNRISE shifts right 48 columns into view at right end where display is not Frozen, flashes with ˆMLI and goes up with ˆOK.

ˆKL48

Restores SUNRISE in Mental Image instantly to original position at left. No display effect.

ˆKD48 ˆMLI ˆOL ˆKL48 ˆE

Trots it out again the same way only it goes down this time. The ˆKL48 moves it back to the left end again so it will be in the original position for the next pass through the loop. Actually we could save the five characters in the second ˆKL48 by including the ˆIO SUNRISE as the first instruction within the loop. We did this as an example showing that loops must restore their initial entry conditions before repeating so that subsequent pases work correctly.

ˆKD48

Brings SUNRISE out to the right once more.

ˆZ ˆMBC ˆKS54

Makes the whole screen Normal and reveals SUNRISE, getting rid of the previously Frozen time, and moves SUNRISE to the left.

ˆZFϕ142

Freezes SUNRISE at the left end.

ˆP9

Upcoming loop is to be done at top speed. It is good practice when creating a loop to setup any parameters which are constant throughout the loop before entering the loop. If the ˆP9 were after the ˆL4 it would have to be executed needlessly on every pass through. There would be no harm done; you wouldn't see any difference in this case but if there were a very fast (computer speed limited) loop involved instead of this slow one you might notice a slowdown if the machine had to waste a few milliseconds interpreting useless instructions on each pass.

ˆL4 ˆIBSYSTEMS ˆOB ˆE

This loop moves SYSTEMS across the screen smoothly from left to right four times. You can't see it though where SUNRISE is Frozen at the left. Since the earlier ˆVϕ set the AWD to ϕ there is no wait before the ˆOB so the entry and exit merge into a smooth left to right scroll.

ˆP3 ˆZ ˆMJD

Unfreezes the screen and slowly melts the old Frozen SUNRISE to the Dark state.

ˆP8 ˆF9 ˆSPRESENTS . . .

Sets the Pace and Font and Shifts text across.

ˆC ˆIBO R A C L E ˆMBC

Brings in double spaced word with Critical Centering. Modulates to Clear state.

ˆZF16ϕ5ϕ76

Freezes columns holding the letters of ORACLE but not the spaces between.

ˆF7 ˆSORACLE ...

Shifts message under Font 7. It appears to be in the background behind the Frozen letters.

ˆZ ˆP9 ˆIB$$$$$THE DISPLAY ˆOA

Unfreeze display and go to high speed for subsequent entry and immediate exit.

ˆIGOF THE FUTURE ˆZF8859

Brings in text and Freezes everything except FUTURE. This uses the wrap around feature of ˆZ.

ˆL2ϕ ˆMXRCI ˆE

Does 2ϕ fast modulations between the Clear and Invert states using random methods. Only visible in FUTURE area.

ˆZ ˆKD3

Normalizes entire display and shifts right three columns. This is done to make the next sequence work better. With C in effect only odd length messages will align with the previous position of FUTURE and so the claw arm could only be a maximum of 15 characters long which would prevent the first three columns from displaying the left end of the arm. If we move FUTURE over three columns we can use 16 charactes for the arm and claw and get alignment with FUTURE and continuity of the arm at the left.

^ZF5542^OK

Freezes FUTURE but removes the rest upward.

^P5^IB>>>>>>>><$$$$$$$^W1ϕ

Slowly brings in open claw. Note that > was redefined as a horizontal line. The ^W1ϕ waits one second and sets the AWD to one second.

^IM>>>>>>>>@FUTURE$

Changes to closed claw and waits one second automatically.

^Z^P9^OA

Normalizes whole display and quickly exits to left.

^V

Resets the Pace, Font, Centering mode, and other parameters to their default values. This isolates the following instructions from any before the ^V.

^ZR7348^MDD^Fϕ

Puts first and last quarters in Reverse and then reveals reversal with the ^MDD. Font ϕ is selected because of the Reversed zone which will see shifting.

^S[]...

Shifts the regatta across.

^Vϕ^P3

Zeros the AWD and sets the Pace slower.

^IB$$$$$$$$$$$[]$$$$^KD2

Since the AWD is zero these two instructions function as one smooth unit. The extra two columns compensate for the two blank columns at the right end of the sailboat definition. This makes the bounce point accurate.

^B631ϕ

Turns the sailboat backwards in the Mental Image.

^ZR^ZN7348

Changes the zones so that now only the second and third quarters are Reversed.

^KS38

Sends the boat left.

^B251ϕ

Turns the boat backwards again.

^Z^ZR7348

Returns the zones to the original pattern.

^KD56

Sends the boat right till it is almost gone.

^L5^KS6^KD6^E

Makes the boat oscillate back and forth five times across a six column space.

^OL

Sinks the boat.

^Z^MCL

Restores the zones to Normal and closes up the hole. The curtain closing technique of ^MCL doesn't change the outside quarters because the previous Reversed Zone already had those columns lit.

^F1^P7^INPUT THE MOTION

Bring in PUT THE MOTION under Font 1 at Pace 7 using method N.

^MEC^Fϕ^P5

Modulates it to a Clear appearance, selects a Clear type font and slows down the pace a little.

^L5^KS6^KD6^F1^KD6^KS6^Fϕ^E

Causes PUT THE MOTION to oscillate back and forth five times across a 12 column span. The Clear Font ϕ is in effect during the left half of the cycle and the Inverted Font 1 during the right half cycle. Font ϕ is in effect when the loop ends, restoring the condition in effect when the loop was first entered.

^OE^V

Removes PUT THE MOTION and resets all parameters to default values.

^IIIN PROMOTION^MCI

Brings in IN PROMOTION by method I. Waits one second since V restored AWD to 1ϕ tenths of a second. Modulates momentarily to Invert state.

^P9^L1ϕ^MDRCI^E

Does ten fast modulates between Clear and Invert states using method D (open curtains).

^L1ϕ^MCRCI^E

Does ten more with method C (close curtains).

^P8

Slows down one notch to Pace 8.

^L2^MLD^MLI^MLL^MLC^Pϕ^E

Each pass of this loop does four flashing modulates from each of the states Dark, Invert, Lit, and Clear to the next one. The first pass is at Pace 8. The ^Pϕ at the end causes Pace 8 to step up one to become Pace 9 for the second pass through. In this case ^P9 would do the same thing. If however, the loop count were 3 and the initial pace were 7, you would have to use the ^Pϕ to get the pace to speed up each time from 7 to 8 to 9. Try it. ^L8^MLRDILC^Pϕ^E would actually be a more efficient way to do the same thing as was done here.

^OO^ON^OJ

Does a pair of ghost exits and then a split ascend/descend exit. This is possible because method codes O and N for ^O are among those that do not wipe out the Mental Image.

^V^P8

The only thing this really does is set the Pace back to 8. The ^V isn't really doing much since the Pace was the only significant parameter that was changed since the last ^V. Nevertheless it is good programming style to separate segments of your programs with ^V instructions to keep them independent of each other's parameters. When you write a program you can only see sixteen characters at a time and so it is easy to forget which parameters are in effect at a given point. A good sprinkling of ^V instructions will help alleviate this. You can just back up a short distance then to find an ^V that serves as a point of reference for all parameters. It also aids in using the Editor's X start command for testing. Any X start mode at an ^V will function identically to the usual P start operation.

^STHIS . . .

Shifts the long sentence across the screen.

^F2^P5^SORACLE . . .

Shifts the next sentence, only with a different font and pace.

^Fϕ^Vϕ

Selects Font ϕ and sets the AWD to ϕ for the upcoming ^IA.

^IAORACLE^P9

Brings in ORACLE from the right and steps the Pace up to 9.

^L3^MGL^MGI^MGD^MGC^E

Does 12 modulates by ascending by ascending method G. this could have been done more compactly with ^L12^MGRLIDC^E but the programmer wanted to be able to try other dynamic methods besides G at different points in the cycle.

^OA

Gets ORACLE off to the left.

^SCAN PUT YOUR PROMOTION^P7^I-BLIGHT$$YEARS

Shifts text and slows down two steps before bringing in LIGHT YEARS by method B.

^P9^L1ϕ

Speeds up to Pace 9 and enters bounce routine loop.

^Z^ZFϕ148^KD6^KS6

Defines right half to be Normal and left to be Frozen. Bounces LIGHT YEARS six columns right and left again. The double space between the two words provides enough of a buffer space so that LIGHT doesn't emerge out from the Frozen zone, and only YEARS appears to move.

^ZR^ZNϕ148

Switches the zones around so that now the right half is Frozen and the left is Normal.

^KS6^KD6^E

LIGHT YEARS bounces left six columns and back right again to center position. This is the end of the loop. Only the LIGHT appears to move because YEARS is now covered by the Frozen zone.

^OK

Causes LIGHT to exit ascending.

^Z^ZFϕ148

Switches back to left half frozen and right half Normal.

^OL

Causes YEARS to exit descending. During the OK and OL it was necessary to freeze one word as the other moved. the Mental Image contains two words both before and after these operations because the K and L dynamic methods for O do not modify the Mental Image.

^Z^P6^IEAHEAD OF

Normalizes the display and slows down before bringing in AHEAD OF.

^ZF615

Freezes the O in OF.

^OK

Takes AHEAD OF out going upwards

^IKTOMORROW

Makes TOMORROW slide up into place with the 0 in the same position.

^P9^L1ϕ^MXRCI^E

Does ten rapid modulations by random methods between the Clear and Invert states.

^OH

Gets TOMORROW off screen and out of the Mental Image. the Frozen O remains on the screen.

^IO$$$$$$O$

Replaces the 0 in the Mental Image. The spaces line up with the letters in TOMORROW. Actually, the first and last space could be omitted and the 0 would still be forced into the same position.

^Z^P8

Normalizes the whole display and goes to Pace 8.

^MID^MLC

Modulates instantly to the Dark state and then by flashing to the Clear state. The Rule of Transfer was already in the Clear state coming in so it had to be changed to Dark before being able to flash into the clear state. Without the ^MID the ^MLC would flash between Clear and Clear which is no flashing at all. The programmer should have noticed though that this pair of instructions could be replaced by just one ^MLD which would flash from the Clear state to the Dark State. The flashing would look identical and the fact that the Rule of Transfer ends up Dark is irrelevant since the subsequent ^KS29 takes over immediately afterwards and exercises the current Font 7 which restores the Rule of Transfer to the Clear state at its end.

^KS29

Causes the O to take a short trip over to a symmetrical position in the left half.

^MID^MLC

Causes it to flash from the Dark to the Clear state. This pair cannot be replaced by single ^MLD because it is important that it end up Clear so that the 0 will be visible when the upcoming ^ZF Freezes it.

^ZF325

Freezes an image of the 0 in the left half.

^KD29

The 0 returns to its old position on the right side.

^MID^MLC

Causes it to flash from Dark to Clear. This pair could also be replaced by one ^MLD since the preceding ^KD29 guarantees that the Rule of Transfer is Clear coming in and the following loop is completely insensitive to the Rule of Transfer when it starts.

Z

Normalizes the whole screen for the loop to follow. The 0 is in the right half of the Mental Image.

^L67^MIC^B^MIC^B^KL1^E

This loop is a computer speed limited high speed loop. It first reveals the O in the right side if the Mental Image with ^MIC and then turns the whole thing backwards so that the 0 is in the mirror image position at the left before revealing it again with another ^MIC. The second ^B turns it back again so the 0 is back where it started in the right half in order that the next pass of the loop will be properly set up. On each pass through, the ^KL1 at the end moves the O one space left which also makes the backwards version move one space right. Each pass only takes about a hundredth of a second and so the entire 67 passes are over in less than a second. It appears as continuous motion of two O characters in opposite directions. If you change the O in the earlier ^IO instruction to a P or some other asymmetrical letter you will be able to appreciate the operation of this loop a little more easily.

^V

Present on general principle of segment isolation but inactive in context on account of following two instructions:

^P5^Fϕ

Selects Pace 5 and Font ϕ for subsequent shifting through Reversed zones.

^ZRϕ1ϕ1ϕ13 ..... ^ZR7912

This sequence of seven ^ZR instructions creates the complex tapered pattern of Normal and Reversed zones. The first four use the extended repeat format.

^SORACLE...

Shifts the sentence through the comb pattern of reversals which gets so dense at the left that legibility fades out near the end. Note how the " is used to make a small s at the end for 8ϕ's.

^MAL^MED^P8^MLL

Does a series of modulations on the empty Mental Image that accents the zone pattern.

^Z^MBD

Normalizes the display and wipes off the old reversal pattern.

^S*>><<

Shifts the dart or rocket ship or whatever across the screen.

It is evident that those skilled in the art, once given the benefit of the foregoing disclosure, may now make numerous other uses and modificatoins of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A display generation apparatus comprising:

(a) means defining a plurality of lamps arranged in an elongated matrix, with columns transverse to the direction of elongation of the matrix, for the purpose of displaying alphanumeric and/or graphic patterns which can be rapidly changed, (b) a microcomputer for controlling the lamp matrix in accordance with a stored display program, (c) means defining a similar matrix of semiconductor bit storage cells, (d) means for causing the lamps in the matrix to respond on a lamp for bit basis to the data patterns stored as the content of the corresponding group of semiconductor bit storage cells, (e) said storage cells being arranged to respond to the microcomputer's busses and control signals in such a fashion tha the microcomputer can load column data patterns intended to effect change in the state of the lamps in a particular column by storing the data pattern at a memory address or output port address corresponding to the position of the designated column in the overall array of lamp columns, according to a selected address to column position translation function, (f) the plurality of said storage cells in conjunction with the memory address space acting as the lamp data buffer.

2. Display generation apparatus in accordance with claim 1 and further comprising:

(g) means for segregating a portion(s) of the system memory for inclusion in a separate address translation regime(s) in which any subgroup of the address bits supplied by the microprocessor are arithmetically added in hardware to a similar number of bits supplied by a selected output registor(s), to generate a modified physical address for said memory portion(s), (h) the content of the selected output register functioning as a rotation offset constant which causes a circular displacement of logical vs. physical address space within the included memory block.

3. Display generation apparatus in accordance with claim 1 and further comprising:

(g') means for segregating a portion of the system memory for inclusion in a conditioned data transfer regime in which an auxillary memory supplies a conditioning signal(s)which selectively, on a cycle by cycle basis, disable the write pulse from affecting memory words or specific bit positions thereof, of said system memory block.

4. Display generation apparatus in accordance with claim 1 and further comprising:

(g'') means for segregating a portion of the system memory for inclusion in a conditional data transfer regime in which an auxillary memory supplies a conditioning signal(s) which selectively on a cycle by cycle basis cause the data being written into said system memory block to be contionally altered by bitwise complementation or other combinational logical function(s) before storage occurs.

5. Display generation apparatus in accordance with any of claims 1, 2 and 3 in which the distinguishing features (g, g', g'') are integrated onto chips with a higher level of functional integration than can be achieved by connecting standard components.

* * * * *